Patented Feb. 7, 1933

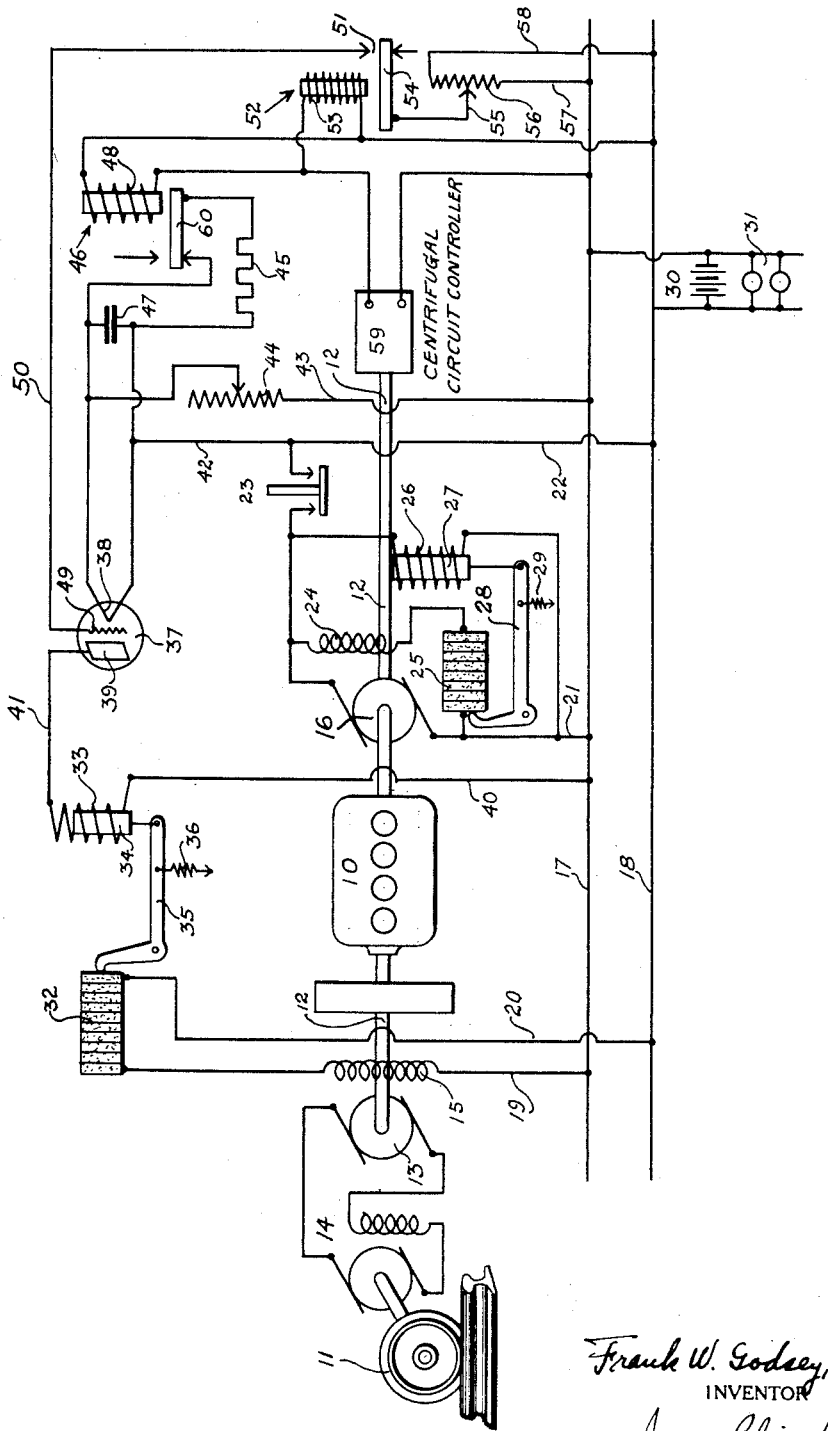

1,896,170

UNITED STATES PATENT OFFICE

FRANK W. GODSEY, JR., OF NEW HAVEN, CONNECTICUT, ASSIGNOR TO THE SAFETY CAR HEATING & LIGHTING COMPANY, A CORPORATION OF NEW JERSEY

VEHICLE DRIVING APPARATUS AND SYSTEM

Application filed August 19, 1929. Serial No. 387,051.

This invention relates to the transmission of power and more particularly to the transmission of power from a prime mover, such as a gas or oil internal combustion engine to the wheels of a vehicle, such as a locomotive.

One of the objects of this invention is to provide a dependable and thoroughly practical system and apparatus for transmitting power, capable of inexpensive embodiment in practical form and capable of efficient operation. Another object is to provide a power transmission between a driving means and a variable load that will dependably cope with the difficulties attendant upon achieving efficent operation of the driving means while permitting wide variation in the character of the load. More particularly, another object of this invention is to provide a power transmission between an internal combustion engine and a load as will automatically insure the maintainance of the desired operating characteristics of the engine itself even though the load is of such a character as to tend to cause departures from such operating characteristics. Another object is to provide a simple, practical and efficient power transmission between an internal combustion engine and the wheels of a locomotive, and to achieve such automatic control of the transmission of the power as will insure the automatic maintenance of the desired speed of the engine itself. Another object is to provide an automatically controlled power transmission that will be of simple construction, reliable action and well adapted to meet the varying conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, the single figure shows diagrammatically one of various possible embodiments of my invention.

Referring now to the drawing, an internal combustion engine 10 adapted to be supplied with, for example, gas or oil as a fuel, is to drive a load diagrammatically indicated as one or more wheels 11 of the vehicle or locomotive to be driven. The engine 10 drives a shaft 12 from which is operated a generator 13, the output of which is supplied to one or more motors 14, preferably of the series type and connected in any suitable manner to drive the load or locomotive wheel 11. The generator 13 has a field or exciting winding 15 supplied with energy from preferably a source other than the generator 13 itself; this source may conveniently take the form of a generator 16 preferably driven from or by the engine 10.

The generator 16 supplies energy, through conductors 21—22, to a train line 17—18 across which the field 15 of the main generator 13 is connected by means of conductors 19—20, respectively. Preferably, the generator 16 is connected to the train line 17—18 by an automatic switch 23 which may be of any suitable construction and adapted to close the circuit upon the attainment by the generator 16 of an appropriate voltage, as, for example, when the apparatus is started up, and to disconnect the generator 16 from the train line 17—18 should the voltage of the generator 16 diminish to or below a predetermined value, as, for example, when the apparatus is stopped.

The generator 16 is regulated in any suitable manner to maintain the voltage of its output substantially constant. Illustratively and conveniently, the shunt field winding 24 of the generator 16 is connected across the terminals of the latter through a variable resistance, preferably in the form of a compressible carbon pile 25. The pressure on the carbon pile is controlled by a voltage responsive coil 26 connected across the terminals of the generator 16 and which acts through the core 27 and bell crank lever 28, against the action of an adjustable spring 29, to vary the pressure and hence the resistance of the carbon pile 25 to maintain the voltage of the generator 16 substantially constant.

Aside from supplying the field winding 15 of the main generator 13 with energy, the train line 17—18 may supply energy to various auxiliary devices, and illustratively I have shown a storage battery 30 and lamps 31 connected to be supplied therefrom.

The output of the generator 13 is controlled preferably by varying the excitation of the field winding 15. Preferably, there is inserted in the circuit of the field winding 15 a variable resistance desirably taking the form of a compressible carbon pile 32, the pressure on and hence the resistance of which is controlled by a coil 33 which acts through the core 34 and the bell crank lever 35, against the action of an adjustable spring 36, upon the free or unanchored end of the carbon pile 32.

The coil 33 is connected in a circuit in which is included a suitable source of potential, preferably the potential across the train line 17—18, and the electronic conduction path contained within a device generally indicated at 37 and which preferably takes the form of a three-element thermionic tube. The device 37 is provided with a filament 38 adapted, when suitably heated, to emit electrons, and coacting with the heated cathode 38 is a plate anode 39. The circuit of coil 33 will thus be seen to extend from one side of the train line 17—18, thence by way of conductor 40 through the coil 33, conductor 41 to the plate anode 39 of the device 37, thence by way of the electronic conduction path between the anode 39 and the cathode 38, and thence by way of conductors 42 and 22 to the other side of the train line 17—18, the potential across which, supplied by the generator 16, is thus also included and made effective in this circuit.

The cathode 38 is supplied with heating current from any suitable source and preferably is bridged across the train line 17—18 by conductors 42—22 on the one hand and conductor 43 on the other hand. A suitable relatively high resistance 44 is included in the filament heating circuit in order to bring the potential of the filament 38 relative to the plate anode 39 relatively low.

Shunted about the filament cathode 38 is a resistance 45, the shunt circuit of which is controlled by the contacts of a relay generally indicated at 46, the contacts being shunted by condenser 47 to prevent excessive sparking. The relay 46 is normally in the position shown in the drawing in which, it will be noted, the shunt circuit about the filament 38 is closed and the current supplied to the filament through conductors 22—42 and 43 is made to divide between the filament 38 and the resistance 45. The adjustable resistance 44 is set so that under these conditions the thermionic emission from the cathode 38 is sufficient, during operation of the engine 10 at its intended speed, to make the path between the cathode 38 and the anode 39 sufficiently conductive to permit the flow through the circuit of the coil 33 of sufficient current to hold the core 34 in a position of equilibrium as against the spring 36. The relay 46 is provided with a winding 48 controlled in a manner hereinafter more clearly described.

The electronic conduction device 37 is also provided with a control element 49, preferably in the form of a grid interposed between the cathode 38 and the anode 39. Leading from the grid 49 is a conductor 50 extending to a contact 51 of a relay generally indicated at 52, the winding 53 of which is controlled in a manner to be more clearly described hereinafter. The movable contact member 54 of the relay 52 is connected to an adjustable contact 55 associated with a resistance 56 bridged, by conductors 57—58, across the train line 17—18, the variable top 55 and the resistance 56 thus forming in effect a potentiometer by means of which a suitable fraction of the potential across the train line 17—18 may be applied to the control grid 49 when the relay 52 is actuated to close the contacts 51—54. The relay 52 normally tends to hold the contacts 51—54 apart.

Relay coils 48 and 53 are connected in parallel and are connected to be energized from the train line 17—18 but under the control of a centrifugally controlled switch mechanism diagrammatically indicated at 59 and driven in any suitable manner, as from the shaft 12, by the engine 10. The device 59 may be of any suitable construction and opens or separates the two circuit-controlling contacts which are included in the circuit of the relay coils 48 and 53 as soon as a certain speed, corresponding to that at which the engine 10 is to operate is exceeded and closes these contacts, thus to energize the relay coils 48 and 53, as soon as the speed of the engine 10 begins to diminish below the above-mentioned intended speed of operation of the engine 10.

Assuming now that the engine 10 begins to speed up and thus to depart from its intended speed of operation, the centrifugal device 59 closes its contacts and thus causes the energization of the relay coils 48 and 53. Relay 46 thus moves the movable contact 60 in a direction to open the shunt circuit about the filament cathode 38 and thus causes a greater heating of the cathode 38 and a greater thermionic emission therefrom. This action greatly increases the conductivity of the electronic conduction path between the cathode 38 and the anode 39 and thus brings about an increased energization of the coil 33 that controls the carbon pile 32.

At the same time relay 52 moves its movable contact 54 into engagement with the fixed contact 51, thus causing the application of a suitable potential to the control element 49 of the vacuum tube 37. This energization of the grid 49 is such as to increase the flow of electrons from the cathode 38 to the anode 39 and thus further to increase the energization of coil 33.

This increased energization of the coil 33 causes the latter to move the bell crank lever 35 in counter-clockwise direction, and thus to increase the pressure on the carbon pile 32 and decrease the resistance of the latter. The excitation of the main generator 13 is thus increased, its power output similarly increased, and the resultant increased load upon the engine 10 causes the latter, for a given throttle setting, to slow down. As soon as the engine 10 slows down sufficiently to cause the centrifugal device 59 to open the circuits of relay coils 48 and 53, the resultant de-energization of these coils permits the shunt circuit about the filament cathode 38 to be restored and the potential removed from the control element 49 of the device 37. The resultant diminishing conductivity of the device 37, the path of which is included in the circuit of the coil 33, thus prevents substantial overstepping in load-increasing direction of the bell crank lever 35 and permits the spring 36 to commence movement of the lever 35 in clockwise direction, thus increasing the resistance 32, diminishing the excitation of the main generator 13, and in thus diminishing the power output of the generator 13, so relieves the engine 10 as to permit it to speed up again. These operations are repeated, it being understood that the circuit-opening and circuit-closing operations of the device 59 preferably take place at the extremes of a relatively narrow margin of speed variation so that the contacts of the device 59 in effect vibrate substantially rapidly and cause substantially similarly rapid vibrations of the relays 46 and 52. Thus, the speed of the engine 10 and parts driven thereby is maintained substantially constant and the intended power output of the engine 10 maintained at the correspondingly appropriate or intended speed of operation.

Assuming that it is desired to attain a different speed constancy, the centrifugal device 59 is adjusted to operate at the other desired speed.

It is also to be understood that while I prefer to affect the conductivity of the vacuum tube 37 by affecting the heating of the filament cathode at the same time that I affect the control element 49, I can achieve excellent results in practice by either varying the heating of the cathode 38 alone, dispensing, if desired, with the control element 49, or by maintaining a constant heating of the filament cathode 38 while varying the potential applied to the control element 49.

It will thus be seen that there has been provided in this invention a system and apparatus for the transmission of power in which the various objects hereinbefore noted, as well as many thoroughly practical advantages, are successfully achieved.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In apparatus of the character described, in combination, a prime mover, a generator driven thereby, means forming an electrical load for receiving energy from said generator, means for controlling the power output of said generator, a thermionic device for controlling the action of said control means, and a centrifugal device driven by said prime mover for controlling the action of said thermionic device.

2. In apparatus of the character described, in combination, a prime mover, a generator driven thereby, means forming an electrical load for receiving energy from said generator, means for controlling the power output of said generator, a device having an electronic conduction path therein and connected to affect said control means, and a centrifugal device responsive to the speed of said prime mover for controlling the conductivity of the electronic conduction path of said device.

3. In apparatus of the character described, in combination, a prime mover, a generator driven thereby, means forming an electrical load for receiving energy from said generator, means for controlling the power output of said generator, a device having a plurality of electrodes with an electronic conduction path therebetween for affecting the action of said control means, a source of potential adapted to be applied to one of said electrodes, and a centrifugal device responsive to the speed of said prime mover for controlling the potential applied to said electrode.

4. In apparatus of the character described, in combination, a dynamo electric machine, means for controlling the excitation thereof, means including a device having an electronic conduction path therein for controlling said excitation-controlling means, and a centrifugal device responsive to the speed of said dynamo electric machine for controlling the conductivity of said electronic conduction path.

5. In apparatus of the character described, in combination, a dynamo electric machine, means for controlling the excitation thereof, means including a device having an electronic conduction path therein for controlling said excitation-controlling means, a source of potential adapted to be applied to one of the electrodes of said device, and a centrifugal device responsive to the speed of said machine for controlling the application of said potential to the electrode of said conduction device.

6. In apparatus of the character described, in combination, a dynamo electric machine, means for controlling the excitation thereof, means including a device having an electronic conduction path therein for controlling said excitation-controlling means, a source of potential adapted to be applied to an electrode of said device, a relay for controlling the potential applied to said electrode, and a centrifugal device responsive to the speed of said machine for controlling the operation of said relay.

7. In apparatus of the character described, in combination, a prime mover, a generator driven thereby, means forming an electrical load for receiving energy from said generator, means including a device having an electronic conduction path therein for controlling the output of said generator, means for varying the conductivity of said conduction path, and a centrifugal device responsive to the speed of said prime mover for actuating said last-mentioned means.

8. In apparatus of the character described, in combination, a prime mover, a generator driven thereby, means forming an electrical load for receiving energy from said generator, means including a device having an electronic conduction path therein for controlling the output of said generator, said means acting to increase the output of said generator upon increase in the conductivity of said conduction path and to decrease the output of said generator upon decrease in the conductivity of said conduction path, means for varying the conductivity of said conduction path, and a centrifugal device responsive to the speed of said prime mover for causing said last-mentioned means to increase the conductivity of said path upon an increase in speed of said prime mover and to decrease the conductivity of said path upon a decrease in the speed of said prime mover.

9. In apparatus of the character described, in combination, a prime mover, a generator driven thereby, means forming an electrical load for receiving energy from said generator, means including a three-element thermionic device for controlling the power output of said generator, one of said elements of said device being a potential-responsive control element, a centrifugal device responsive to the speed of said prime mover, a source of potential adapted to activate said control element, and means responsive to said centrifugal device for controlling the potential applied to said control element.

10. In apparatus of the character described, in combination, a prime mover, a generator driven thereby, means forming an electrical load for receiving energy from said generator, means including a three-element thermionic device for controlling the power output of said generator, a source of energy for heating the electron-emitting element of said device, and a device responsive to the speed of said prime mover for controlling the heating of said electron-emitting element.

11. In apparatus of the character described, in combination, a prime mover, a generator driven thereby, means forming an electrical load for receiving energy from said generator, means including a three-element thermionic device for controlling the power output of said generator, one of the elements of said device being a heated electron-emitting element and another being a control element, and a centrifugal device responsive to the speed of said prime mover for controlling the activity of said two last-mentioned elements of said device.

12. In apparatus of the character described, in combination, a dynamo electric machine, means including a device having a plurality of electrodes and an electronic conduction path therebetween and having also a control element, means for affecting said control element, and a centrifugal device responsive to the speed of said machine for affecting said two last-mentioned means.

13. In apparatus of the character described, in combination, a dynamo electric machine having a field, means including a thermionic device having anode, cathode and control electrodes for controlling the field of said machine, and means responsive to the speed of said machine for controlling the conductivity of said thermionic device.

14. In apparatus of the character described, in combination, a dynamo electric machine having a field, means including a thermionic device having anode, cathode and control electrodes for controlling the field of said machine, and means responsive to the speed of said machine connected to said control electrode for controlling the conductivity of said thermionic device.

15. In apparatus of the character described, in combination, a dynamo electric machine having a field, means including a thermionic device having anode, cathode and control electrodes for controlling the field of said machine, and means responsive to the speed of said machine connected to the control electrode of said device for rendering effective said field control means.

16. In apparatus of the character described, in combination, a dynamo electric machine, means for controlling the excitation thereof, means including a thermionic device having anode, cathode and control electrodes for actuating said excitation control means, means connected to said cathode electrode for rendering effective said excitation control actuating means, means connected to control electrode for rendering effective said excitation control actuating means, and a centrifugal device responsive to the speed of said machine for operatively affecting said two last-mentioned means.

17. In apparatus of the character described, in combination, a dynamo electric machine, means including a resistance for controlling the excitation thereof, means including a thermionic device having anode, cathode and control electrodes for actuating said resistance, and means responsive to the speed of said machine connected to said thermionic device for operating said resistance actuating means.

18. In apparatus of the character described, in combination, a dynamo electric machine, means including a resistance for controlling the excitation thereof, means including a thermionic device having anode, cathode and control electrodes for actuating said resistance, means connected to the cathode of said device for rendering effective said resistance actuating means, means connected to the control electrode of said device for rendering effective said resistance actuating means, and means responsive to the speed of said machine for operatively affecting said two last-mentioned means.

19. In an apparatus of the character described, in combination, a dynamo electric machine, means for controlling the output thereof, means including a thermionic device having anode, cathode and control electrodes for actuating said output control means, means connected to said control electrode for operating said actuating means, and means responsive to the speed of said machine for rendering effective said last-mentioned means.

20. In an apparatus of the character described, in combination, a dynamo electric machine, means for controlling the output thereof, means including a thermionic device having anode, cathode and control electrodes for actuating said output control means, means connected to said control electrode for operating said actuating means, means connected to said cathode electrode for operating said actuating means, and means responsive to the speed of said machine for rendering effective said two last-mentioned means.

21. In apparatus of the character described, in combination, a dynamo electric machine, means for controlling the speed thereof, means including a thermionic device having anode, cathode and control electrodes for actuating said speed control means, means connected to said control electrode for operating said actuating means, and means responsive to the speed of said machine for rendering effective said last-mentioned means.

22. In apparatus of the character described, in combination, a dynamo electric machine, means for controlling the speed thereof, means including a thermionic device having anode, cathode and control electrodes for actuating said speed control means. means connected to said control electrode for operating said actuating means, means connected to said cathode electrode for operating said actuating means, and means responsive to the speed of said machine for rendering effective said two last-mentioned means.

In testimony whereof, I have signed my name to this specification this fourteenth day of August, 1929.

FRANK W. GODSEY, Jr.